Feb. 26, 1946.  A. SIMMON ET AL  2,395,590
DEVICE FOR MINIMIZING CURVATURE OF FILM IN CAMERAS
Filed Feb. 10, 1944  2 Sheets-Sheet 1
Fig:1
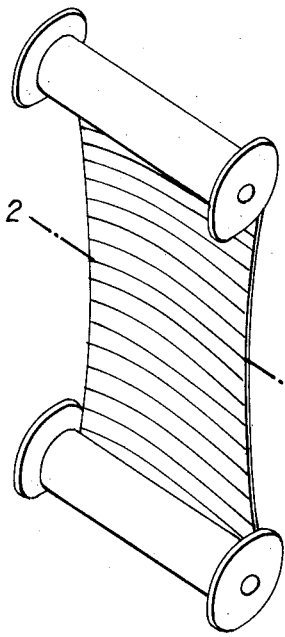
Fig:3 (PRIOR ART)
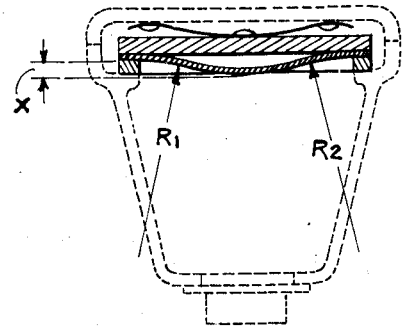
Fig:4
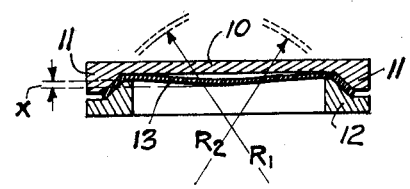
Fig:2
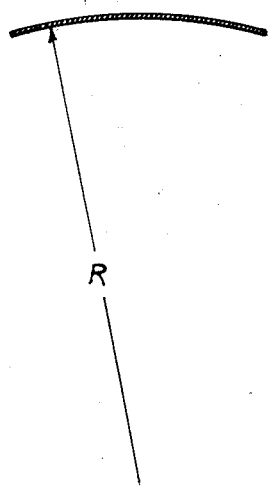
Fig:5
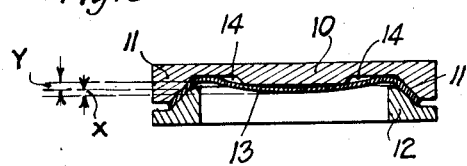
Alfred Simmon
Louis L. Weisglass
INVENTORS
BY Walter E. Wollheim
ATTORNEY Feb. 26, 1946.  A. SIMMON ET AL  2,395,590
DEVICE FOR MINIMIZING CURVATURE OF FILM IN CAMERAS
Filed Feb. 10, 1944    2 Sheets-Sheet 2
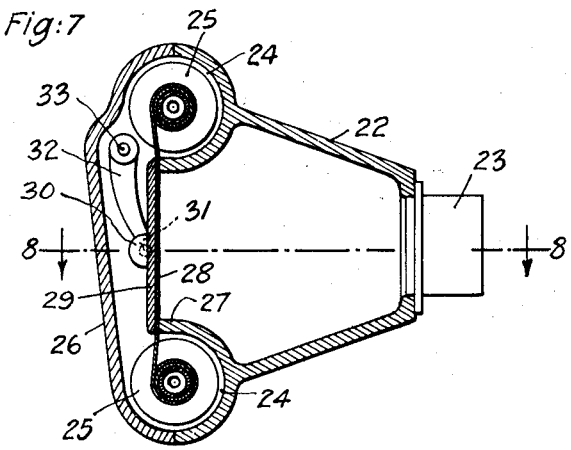
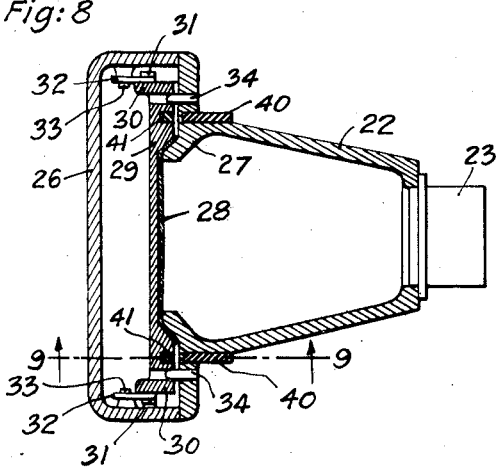
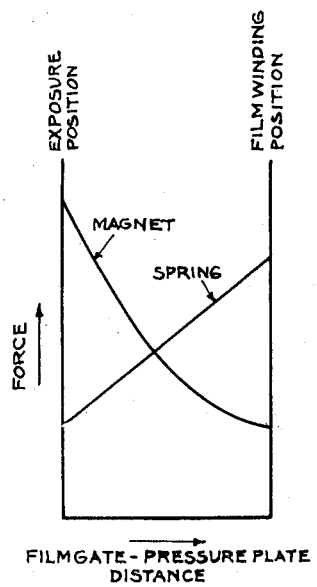
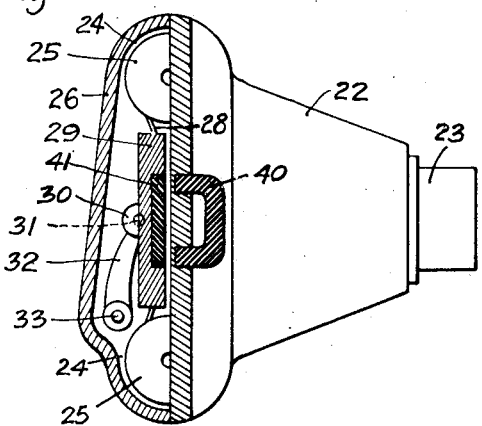
Alfred Simmon
Louis L. Weisglass
INVENTORS
BY Walter E. Wollheim
ATTORNEY Patented Feb. 26, 1946

2,395,590

UNITED STATES PATENT OFFICE 2,395,590

DEVICE FOR MINIMIZING CURVATURE OF FILM IN CAMERAS

Alfred Simmon, Jackson Heights, and Louis L. Weisglass, New York, N. Y.; said Weisglass assignor to said Simmon Application February 10, 1944, Serial No. 521,826

9 Claims. (Cl. 95—31)

One of the important factors determining the definition of a photographic image is the accuracy with which the film is positioned as near to the focal plane of the photographic lens as possible. For the purpose of this invention, the focal plane may be defined simply as that plane in which the lens forms the sharpest possible image of the object which is being photographed. This plane can very easily be found on any camera with the aid of a ground glass. Wherever the expression "focal plane" is used in this specification and the appended claims this plane is meant. Photographic film consists of a base of transparent and flexible material, usually cellulose nitrate or acetate, one side of which is coated with a light-sensitive emulsion. Stresses are thereby set up which give the film a very strong tendency to curl, and it is quite difficult to keep it with a sufficient degree of accuracy as near to the focal plane as possible and particularly to keep its curvature reduced to a minimum so that it approaches substantially a true plane surface in a satisfactory manner.

In Fig. 1 we have shown a typical roll film in the process of being wound from one spool unto another, the supports for the two spools not being shown for sake of clearness. Observation of a film held in this manner will show that it assumes a very strong curvature in a plane parallel to the film spool axis as shown in Fig. 2. In the other direction, i. e., at right angles to the film spool axis, the curvature is considerably less pronounced and can easily be eliminated by providing a brake on the film storage spool so that the operator tensions the film as he winds it. Brakes of this type are well known in the art and are, therefore, not shown, but we shall assume that a brake of some kind is being used in connection with our device, thereby substantially minimizing any film curvature in a plane at right angles to the film spools. It will, therefore, be the sole purpose of our device to control the curvature in a plane parallel to the film spools, as shown in Fig. 2, in cross section taken along the plane of line 2—2 in Fig. 1.

In spite of the importance of flattening or reducing the deviation of the film from the focal plane to the smallest possible dimensions during the exposure, only rather primitive and ineffective devices have been used heretofore and the whole problem has apparently been little understood and neglected. The standard procedure on the vast majority of all existing cameras is simply to use an aperture plate or film gate with a plane surface against which the film is pressed by a spring actuated pressure plate, also with a plane surface. A device of this character is shown in Fig. 3 labelled "Prior Art." The position of the film is, of course, shown in an exaggerated manner which will be true for all following illustrations as well. The film freely suspended between two film spools assumes a curvature with the radius R Fig. 2. The film sandwiched between a plane film gate and a plane pressure plate has the tendency to maintain this curvature, as far as it is not prevented therefrom along the edges, which are the only parts of the film really in the focal plane, and assumes, therefore, the position shown in Fig. 3. The deviation from the true focal plane shall be called X, and amounts by actual measurement to as much as .015" for a 2¼ x 3¼ image area.

This "maintainance of curvature" theory explains why any increase of the spring force pressing the pressure plate against the film gate fails to improve the position of the film to any noticeable degree, since merely increased pressure will be exerted against the edges of the film which are always flat, and the tendency of the film to bulge in the center will not be overcome.

In Fig. 4 we have shown a film gate and pressure plate of a novel shape by means of which this tendency of the film to maintain its curvature is utilized in order to keep it more nearly flat and more nearly in the focal plane. It will be understood that Fig. 4 represents a cross section of film gate or aperture plate, film, and pressure plate, parallel to the film spool axis, i. e., similar to Fig. 2. In this figure the pressure plate 10 has two upturned flanges 11 which form an angle of approximately 135° with the flat center part of the pressure plate. The side members of the film gate 12 are shaped to cooperate with this pressure plate 10 making due allowance for the thickness of the film 13. Either side of the film tries to maintain its curvature as shown in dotted lines. However, the edge of the film is now disposed at a 135° angle with respect to the focal plane and, therefore, the centers of the curvature radii R—1 and R—2 are now situated as shown in Fig. 4 instead of the manner shown in Fig. 3. It will be clear that thereby a bending momentum is exerted on the center part of the film trying to press it against the pressure plate 10. The deviation X from the true focal plane is, therefore, considerably less, approximately .005".

This condition can be further improved in the manner shown in Fig. 5. As can be seen, the shape of the film gate is the same, but the shape of the pressure plate has been modified by adding two shallow grooves 14 of substantially trapezoid cross section on either side of the flat center part of pressure plate 10. The result of this relief is that the edges of the film assume positions slightly behind the focal plane as at Y, and the center of the film slightly in front of the focal plane, as at X. By means of this expedient the deviation from the focal plane can approximately be halved as compared to the condition shown in Fig. 4, or the film can be maintained within the focal plane with an average accuracy of ±.003".

Inspection of Figs. 4 and 5 discloses that the pressure plate is substantially concave in shape and the complementary aperture plate substantially convex in so far as their film opposed surfaces are concerned.

In actual practice we have found that best results can be obtained by making the included angle between the flat central surface of the pressure plate 10 and each of its inclined edges not less than 120° and not more than 165°, and the width of each of the grooves 14 not less than 10 percent and not more than 25 percent of the width of the pressure plate.

The pressure plate is usually pressed against the film gate or aperture plate by means of one or two leaf springs 20 as shown in Fig. 3. The leaf springs are either relatively weak so that they do not impede the winding of the film, or the springs are somewhat stronger and a cam actuated detracting device is provided by means of which the pressure plate can be slightly detracted from the aperture plate to facilitate the advancement of the roll film. Springs have quite generally a very undesirable property for this application, since they exert their maximum force when the pressure plate is detracted and their minimum force in the working position, i. e., during the exposure when the pressure plate is pressed against the aperture plate. In spite of the fact that this behavior is exactly the opposite of what would theoretically be desirable, springs are being used with a flat film gate and pressure plate such as shown in Fig. 3 because then only a relatively moderate pressure is required, and the spring is only called upon to perform a very small movement. However, with film gates and pressure plates as shown in Figs. 4 and 5, springs are unsatisfactory because, manifestly, a much larger pressure is necessary to force the film into the bent shape, as shown, and because the stroke of the pressure plate, i. e., the distance by which it must be detracted by the aperture plate in order to permit unimpeded film winding, is much larger than with a flat plate. Aperture and pressure plates of the shape shown in Figs. 4 and 5 will, therefore, not work satisfactorily with springs and it will be necessary to devise other means to provide the necessary force.

We have found that a very satisfactory device for the aforesaid purpose is a set of permanent magnets. A magnet has exactly the characteristics theoretically desirable for this application. It exerts its maximum force when the pressure plate is closest to the aperture plate, i. e., during the exposure, and it exerts a minimum force when the pressure plate is relatively far away, i. e., during the film winding period when the pressure plate is detracted from the aperture plate.

Fig. 6 shows diagrammatically the relation between the force exerted by a spring and a magnet, respectively, in relation to the distance between the aperture plate and the pressure plate. The force of a spring declines as a straight line function, as shown, with decreasing film gate-pressure plate distance, whereas the force of a magnet increases with decreasing film gate-pressure plate distance. The rate of increase depends upon the shape of the magnet but is usually a little less than in inverse proportion to the square of this distance.

It is understood that cameras of this type are equipped with a cam operated detracting device for the pressure plate, which may, preferably, be actuated simultaneously with the film winding mechanisms. Devices of this type are well known in the art, and since a device of this type does not form part of this invention, none has been shown in our drawings.

A camera equipped with an aperture and pressure plate according to our invention and with magnetic attracting means between these two elements is shown in Figs. 7, 8 and 9.

Fig. 7 shows a horizontal cross sectional view through the camera;

Fig. 8 shows a vertical sectional view through the camera along the plane of line 8—8 in Fig. 7; and Fig. 9 shows a cross sectional view along the plane of line 9—9 in Fig. 8 showing particularly one of the magnets and its armature.

It will be understood that those parts of the camera which have no bearing on this invention are shown more or less diagrammatically and that many elements have been omitted in the interest of clearness. For example, no focusing device for the lens and no shutter have been shown.

The camera consists of a camera body 22 which supports a lens 23 in front and which has two pockets 24 on either side for the two film spools 25. A camera back 26 is provided which forms a light-tight enclosure for the film. The aperture plate 27 is shown as an integral part of the camera housing 22. The roll film 28 is sandwiched between this aperture plate 27 and the pressure plate 29. The pressure plate 29 is supported in such a way that it is freely movable or "floating." This can, for example, be done in the manner shown, i. e., two lugs 30 are provided which are equipped with pivots 31 cooperating with two levers 32. The other ends of the levers 32 are rotatably fastened on pivots 33 to the camera back 26. During the exposure the pressure plate assumes the position shown in our drawings, whereas during the film winding period it will be pushed back or detracted by cam means which are not shown since they do not form part of this invention. In order to obtain the proper register between pressure plate and aperture plate the camera housing is equipped with at least two locating pins 34 which engage corresponding holes in the pressure plate 29. These locating pins are rather short so that they guide the pressure plate only during the last part of its forward stroke.

Two small permanent magnets 40 are mounted on the camera housing in the position shown in Figs. 8 and 9, and two small soft iron pieces 41 are fastened to the pressure plate 29 forming the armature for the two magnets 40. The arrangement can, of course, be reversed, i. e., the magnets may be mounted to the pressure plate and the armature piece may be mounted to the camera housing should this, for any reason, appear desirable.

In operation, as stated before, the pressure plate, being "floating," is drawn toward the magnet and causes the film to assume the position shown particularly in Figs. 4, 5, and 7, and effectively reduces the curvature of the film to a minimum.

It is understood that various changes in form, proportions and minor details of construction may be resorted to without departing from the principles or sacrificing any of the advantages of the invention as defined in the appended claims.

What we claim as new is:

1. In a camera having a pair of film spools and film between them, a pressure plate and an aperture plate, the film opposing surface of said pressure plate, in a plane parallel to said spools, having forwardly inclined edges, and a flat surface between them, the angle between each of said inclined edges and said flat surface ranging between 120° and 165°, said aperture plate having side members shaped conforming to the said edges of the pressure plate, and means to draw said plates together, whereby bending the edges of the film by clamping them between said side members and pressure plate causes the curvature of the portion of the film intermediate its edges to be minimized and approach closely said flat surface, the width of said inclined edges plus the width of said flat surface between them being wider than the width of the film as measured in a direction parallel to the axis of the film spools, the film being subjected to bending stresses only and being free from tensile stress in the direction parallel to the axis of the film spools.

2. In a camera having a pair of film spools and a film between them, a pressure plate and an aperture plate, the film opposing surface of said pressure plate, in a plane parallel to said spools, having a flat central part, a shallow recess at either side of said central part, and forwardly inclined edges adjacent said recesses, said aperture plate having side members shaped conforming to the said edges of the pressure plate, and means to draw said plates together, whereby bending the edges of the film by clamping them between said side members and pressure plate causes the film to enter said shallow recesses and the curvature of the film intermediate said recesses to be minimized and approach closely said flat central part, the width of said inclined edges plus the width of said recesses and said flat central part between them being wider than the width of the film as measured in a direction parallel to the axis of the film spools.

3. In a camera having a pair of film spools and film between them, a pressure plate and an aperture plate, the film opposing surface of said pressure plate, in a plane parallel to said spools, having a flat central part, a shallow recess, ranging in width between 10 and 25 percent of the width of said pressure plate, at either side of said central part, and forwardly inclined edges adjacent said recesses, said aperture plate having side members shaped conforming to the said edges of the pressure plate, and means to draw said plates together, whereby bending the edges of the film by clamping them between said side members and pressure plate causes the film to enter said shallow recesses and the curvature of the film intermediate said recesses to be minimized and approach closely said flat central part, the width of said inclined edges plus the width of said recesses and said flat central part between them being wider than the width of the film as measured in a direction parallel to the axis of the film spools.

4. In a camera having a pair of film spools and film between them, a pressure plate and an aperture plate, the film opposing surface of said pressure plate, in a plane parallel to said spools, having a flat central part, a shallow recess at either side of said central part, and forwardly inclined edges adjacent said recesses, the angle between each of said inclined edges and said flat central part ranging between 120° and 165°, said aperture plate having side members shaped conforming to the said edges of the pressure plate, and means to draw said plates together, whereby bending the edges of the film by clamping them between said side members and pressure plate causes the film to enter said shallow recesses and the curvature of the film intermediate said recesses to be minimized and approach closely said flat central part.

5. In a camera having a pair of film spools and film between them, a pressure plate and an aperture plate, the film opposing surface of said pressure plate, in a plane parallel to said spools, having a flat central part, a shallow recess, ranging in width between 10 and 25 percent of the width of said pressure plate, at either side of said central part, and forwardly inclined edges adjacent said recesses, the angle between each of said inclined edges and said flat central part ranging between 120° and 165°, said aperture plate having side members shaped conforming to the said edges of the pressure plate, and means to draw said plates together, whereby bending the edges of the film by clamping them between said side members and pressure plate causes the film to enter said shallow recesses and the curvature of the film intermediate said recesses to be minimized and approach closely said flat central part.

6. In a camera having a pair of film spools and film between them, a pressure plate and an aperture plate, the film opposing surface of said pressure plate, in a plane parallel to said spools, having a flat central part, a shallow recess at either side of said central part, and forwardly inclined edges adjacent said recesses, said aperture plate having side members shaped conforming to the said edges of the pressure plate, and means to draw said plates together, whereby bending the edges of the film by clamping them between said side members and pressure plate causes the film to enter said shallow recesses and the curvature of the portion of the film intermediate said recesses to be minimized and approach closely said flat central part, the depth of each of said recesses being such as to bring the film in front of said flat central part into a position slightly ahead of the focal plane of the camera and the film in front of each recess into a position slightly behind the focal plane, the width of said inclined edges plus the width of said recesses and said flat central part between them being wider than the width of the film as measured in a direction parallel to the axis of the film spools.

7. In a camera having a pair of film spools and film between them, a pressure plate and an aperture plate, the film opposing surface of said pressure plate, in a plane parallel to said spools, having a flat central part, a shallow recess at either side of said central part, and forwardly inclined edges adjacent said recesses, said aperture plate having side members shaped conforming to the said edges of the pressure plate, and magnetic means to draw said plates together, including at least one permanent magnet and its armature, whereby bending the edges of the film by clamping them between said side members and pressure plate causes the film to enter said shallow recesses and the curvature of the film intermediate said recesses to be minimized and approach closely said flat central part, the width of said inclined edges plus the width of said recesses and said flat central part between them being wider than the width of the film as measured in a direction parallel to axis of the film spools.

8. In a camera having a pair of film spools and film between them, a pressure plate and an aperture plate, the film opposing surface of said pressure plate, in a plane parallel to said spools, having a flat central part, a shallow recess, ranging in width between 10 and 25 percent of the width of said pressure plate, at either side of said central part, and forwardly inclined edges adjacent said recesses, the angle between each of said inclined edges and said flat central part ranging between 120° and 165°, said aperture plate having side members shaped conforming to the said edges of the pressure plate, and magnetic means to draw said plates together, whereby bending the edges of the film by clamping them between said side members and pressure plate causes the film to enter said shallow recesses and the curvature of the film intermediate said recesses to be minimized and approach closely said flat central part.

9. In a camera having a pair of film spools and film between them, a pressure plate and an aperture plate, the film opposing surface of said pressure plate, in a plane parallel to said spools, having a flat central part, a shallow recess at either side of said central part, and forwardly inclined edges adjacent said recesses, said aperture plate having side members shaped conforming to said edges of the pressure plate, and magnetic means to draw said plates together including at least one permanent magnet and its armature, whereby bending the edges of the film by clamping them between said side members and pressure plate causes the film to enter said shallow recesses and the curvature of the portion of the film intermediate said recesses to be minimized and approach closely said flat central part, the depth of each of said recesses being such as to bring the film in front of said flat central part into a position slightly ahead of the focal plane of the camera and the film in front of each recess into a position slightly behind the focal plane, the width of said inclined edges plus the width of said recesses and said flat central part between them being wider than the width of the film as measured in a direction parallel to the axis of the film spools.

ALFRED SIMMON.
LOUIS L. WEISGLASS.